Feb. 15, 1938.  T. McG. AIKEN  2,108,246
PHOTOGRAPHIC APPARATUS
Filed Oct. 12, 1936
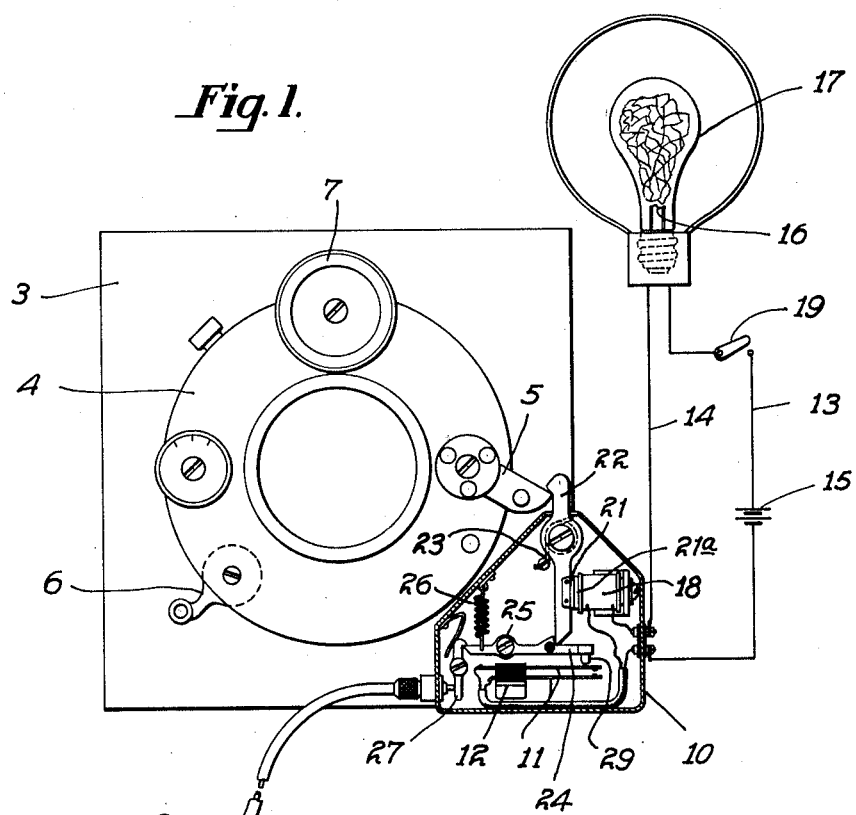
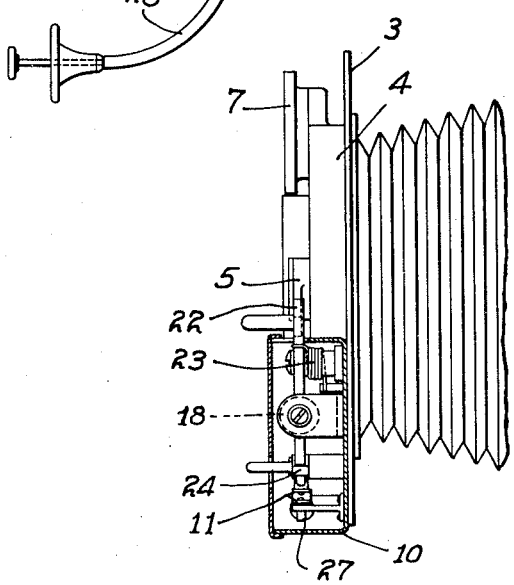
INVENTOR
Thomas McG. Aiken,
By Archworth Martin
Attorney.

Patented Feb. 15, 1938

2,108,246

UNITED STATES PATENT OFFICE 2,108,246

PHOTOGRAPHIC APPARATUS

Thomas McG. Aiken, Pittsburgh, Pa.

Application October 12, 1936, Serial No. 105,168

6 Claims. (Cl. 67—29)

My invention relates to photographic apparatus and more particularly to apparatus for use in the taking of flashlight pictures wherein electric photoflash bulbs are employed for providing the illumination.

Various attempts have been made to effect proper synchronization as between the period of time during which the shutter is open for exposure of the plate or film and the period of light flash. These periods are measured in small fractions of a second and difficulty has been experienced in insuring that the camera shutter will be open at the time of maximum intensity of illumination from the bulb.

According to one prior method, the trigger which releases the shutter-operating mechanism is actuated so that the mid-point or wide open position of the shutter in the cycle of shutter opening and closing movement, will occur about .022 second after the circuit is closed through the flash lamp. The flash lamps contain fuses which are ruptured by the electrical current to effect combustion of the illuminating material, with maximum intensity of illumination at about .020 to .023 second after closing of the circuit. However, it is impossible to insure that all fuses will be ruptured at a definite period of time after the circuit is closed, with the result that there is variation as between the time of maximum shutter opening and the time of maximum illumination.

My invention has for one of its objects the provision of means and a method whereby there will be a definite time relation as between the cycle of shutter opening-and-closing movement and the lamp flash, which is not affected by variations in the time required for fuses to become ruptured.

More specifically, my invention comprises means for closing an electrical circuit through a photoflash lamp, and shutter-operating means automatically actuated in sequence therewith at a predetermined time after the fuse of the lamp has been ruptured, thereby insuring proper timing as between the shutter movement and the flash, notwithstanding variations in the lamp fuses.

One form of mechanism for practicing my invention is shown in the accompanying drawing wherein Figure 1 is a face view of a camera lens frame with my apparatus applied thereto, and Fig. 2 is a side elevational view thereof, partially in section.

The lens frame is indicated by the numeral 3 and carries the usual casing 4 for the shutter and the operating mechanism therefor. These parts may be of any of various standard types, the type here shown being known in the trade as the "compur". The tensioned lever which operates the shutter is represented by the numeral 5, its extremity being modified somewhat in order to permit the cooperation therewith of my mechanism. The trigger 6 which is usually employed for releasing the lever 5 to effect actuation of the shutter will be disconnected when my apparatus is employed with the camera. The adjustable disc 7 for varying the duration of shutter opening will be employed in the usual manner, and is set so that the shutter will be operated at a speed of one-one hundredth second or faster.

My apparatus is shown as mounted in a casing 10, and may be secured in any suitable manner to the lens frame 3. A pair of spring contact switch members 11, of a well known form, are mounted on a base 12 within the casing, and are normally spaced apart, by reason of their inherent resiliency. The switch controls a circuit through electrical conductors 13 and 14, a battery 15 and the fuse 16 of a photoflash lamp 17. An electromagnet 18 is also connected in series in the circuit.

When the switch 11 is closed, as well as a hand switch 19, the circuit through the lamp 17 and the magnet 18 will be completed, and the magnet will be energized to hold an armature 21 tightly against the core 21a of the magnet. The armature is carried by a pivotally mounted snubbing lever 22, the snubbing lever at that time serving to hold the shutter-operating lever 5 in its tensioned or set position. A spring 23 tends to hold the armature 21 against the core of the magnet, so that a very small amount of current in the coil will hold the snubbing lever against movement under the pressure of the tensioned operating lever 5.

A latch lever 24 is pivotally mounted at 25 to the casing 10 and in the position shown in the drawing, latches the snubbing lever 22 against movement under the biasing force of the shutter lever 5. A spring 26 exerts a pulling force on the lever 24 tending to move it out of latching position with respect to the lever 22. A spring pressed trigger 27, when in the position shown in Fig. 1, holds the lever 24 against movement.

With the parts in the position shown in Fig. 1, the camera and the control apparatus therefor are ready for the taking of a picture. To photograph rapid action pictures and prevent blurred negatives, a shutter speed of .010 second is preferably employed. A cable release 28 of well-known form is employed for operating the trigger 27 to release the latch lever 24. Thereupon, the lever is rocked by the tension spring 26 to close the switch members 11. The spring contacts are so adjusted relative to the latched position of the lever 24 that the spring contacts are closed before the latch lever moves out of engagement with the snubbing lever 22, the switch arms 11 both flexing downwardly under the pressure of the insulating knob 29 of the latch lever to permit the lever to move clear of the snubbing lever. During this downward movement, the series circuit through the lamp fuse 16 and the magnet 18 is closed, so that when the latch lever 24 moves completely clear of the snubbing lever 22, the magnet will hold the armature 21 until the circuit is broken through rupturing of the fuse 16.

Ordinarily the fuse will rupture or break down perhaps in about .016 second after the circuit has been closed, but this will vary with different fuses. During this period, the magnet 18 is maintained energized and holds the snubbing lever and prevents release of the shutter-operating lever 5. Upon rupturing of the fuse, the armature is released and the tension on the shutter-operating lever 5 causes it to swing the snubbing lever 22 in a clockwise direction a distance sufficient for the lever 5 to pass and effect operation of the shutter.

The peak or high point of illumination of the bulb will ordinarily occur about .006 second after rupture of the fuse and the circuit through the magnet 18 opened thereby, but, as above stated, this time may vary somewhat in either direction. In any event, the lever 22 and consequently the shutter lever 5 will be released immediately upon rupturing of the fuse, so that the shutter will always be operated at a definite period following the rupturing of the fuse; and while the flash or illumination in the tube is attaining its maximum luminosity, the shutter will be moving toward its fully opened position and continue its movement until it again closes, during which latter stage of shutter movement, the illumination will be fading away. The wide open position of the shutter is attained in about .005 second after the magnet is de-energized, and during such period the tube is reaching its high point of illumination. Thus, the mid-point of the shutter opening period and the most intense period of flash duration will be attained substantially concurrently.

In order to reset the apparatus for the taking of another picture, a new bulb is inserted, the lever 5 is drawn to its set position and the right-hand end of the latch bar 24 is raised to restore it into locking engagement with the lever 22 and the trigger 27.

I claim as my invention:

1. The combination with a camera shutter which is adapted to be placed under operating tension, of a magnetically-controlled restraining device therefor, a photoflash lamp having its fuse in series with the magnet of said device, and means for supplying electric current to the circuit of said fuse and magnet, the circuit through the magnet being broken through the rupture of said fuse.

2. The combination with the shutter-operating lever of a camera, of a photoflash lamp having a fuse, means for locking said lever against movement, means for supplying electrical current to said fuse, means for closing the circuit through the fuse and for immediately thereafter releasing said locking means, and a holding device for said lever, which is rendered effective by the current in said circuit and which is rendered ineffective upon interruption of the circuit through rupturing of the fuse.

3. The combination with the shutter-operating lever of a camera, of a photoflash lamp having a fuse, a snubbing lever for holding the shutter-operating lever against movement under tension, a latch bar for holding the snubbing lever against movement under pressure of the said operating-lever, a tension element urging the latching lever toward release position with respect to the snubbing lever, a trigger for holding the latch lever against movement by the tension element, an electrical circuit including the said photoflash lamp, an electro-magnet in said circuit in series with said lamp, a switch for said circuit, positioned to be closed through movement of the latching lever to release position when the trigger is disengaged from the latching lever, and an armature carried by the snubbing lever in position to be held by the electro-magnet upon closure of said switch, the switch being so arranged as to be closed by the latch bar before the latch bar has moved entirely clear of the snubbing lever.

4. The method of timing the movement of a camera shutter with respect to the illumination of an electrical photoflash lamp, which comprises restraining the shutter against movement under spring tension, by an electrical circuit through the lamp, and causing the restraining force to be released through rupturing of the lamp circuit by the flashing of the lamp.

5. The method of timing the movement of a camera shutter with respect to the illumination of an electrical photoflash lamp, which comprises closing an electrical circuit through the lamp and causing the shutter to be opened through rupture of the lamp circuit by the flashing of the lamp.

6. The method of timing the movement of a camera shutter with respect to the illumination of an electrical photoflash lamp, which comprises closing an electrical circuit through the lamp and causing the shutter to be moved through an opening and closing cycle by rupture of the lamp circuit by the flashing of the lamp.

THOMAS McG. AIKEN.